(12) United States Patent
Liu et al.

(10) Patent No.: US 11,788,196 B2
(45) Date of Patent: Oct. 17, 2023

(54) $ABO_3$ TYPE HIGH-ENTROPY PEROVSKITE $BA_x(FECONIZRY)_{0.2}O_{3-delta}$ ELECTROCATALYTIC MATERIAL AND PREPARATION METHOD THEREOF (71) Applicant: Jiangnan University, Wuxi (CN)

(72) Inventors: Tianxi Liu, Wuxi (CN); Kaibin Chu, Wuxi (CN); Feili Lai, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/176,676

(22) Filed: Mar. 1, 2023

(65) Prior Publication Data

US 2023/0203681 A1 Jun. 29, 2023

Related U.S. Application Data

(63) Continuation of application No. PCT/CN2022/075453, filed on Feb. 8, 2022.

(30) Foreign Application Priority Data

Sep. 26, 2021 (CN) .......................... 202111131005.4

(51) Int. Cl.
 C25B 11/077 (2021.01)
 C25B 1/27 (2021.01)
 C01B 35/12 (2006.01)

(52) U.S. Cl.
 CPC ........ *C25B 11/0773* (2021.01); *C01B 35/128* (2013.01); *C25B 1/27* (2021.01);
 (Continued)

(58) Field of Classification Search
 CPC ...................... C04B 2235/768; C25B 11/0773
 See application file for complete search history.

(56) References Cited

U.S. PATENT DOCUMENTS

| | | | |
|---|---|---|---|
| 4,812,300 A | 3/1989 | Quinlan et al. | |
| 2001/0018989 A1* | 9/2001 | Taniguchi | ............ C01G 49/009 |
| | | | 174/265 |
| 2012/0129689 A1 | 5/2012 | Yoshii et al. | |

FOREIGN PATENT DOCUMENTS

| | | |
|---|---|---|
| CN | 109529873 A | 3/2019 |
| CN | 113171779 A | 7/2021 |
| CN | 113737214 A | 12/2021 |

OTHER PUBLICATIONS

Kazunari Miyazaki et al. "Development of Ni Ba(Zr,Y)O3 Cermet Anodes forDirect Ammonia-Fueled Solid Oxide Fuel Cells" Journal of Power Sources, Oct. 15, 2017, vol. 365. p. 148-154.

(Continued)

*Primary Examiner* — Matthew E. Hoban
(74) *Attorney, Agent, or Firm* — IPRO, PLLC; Na Xu (57) ABSTRACT

The present disclosure discloses an $ABO_3$ type high-entropy perovskite $Ba_x(FeCoNiZrY)_{0.2}O_{3-\delta}$ electrocatalytic material and a preparation method thereof, belonging to the technical field of electrocatalytic materials. The electrocatalytic material is prepared by taking hydrated cobalt nitrate, hydrated ferric nitrate, hydrated nickel nitrate, barium nitrate, hydrated yttrium nitrate, hydrated zirconium nitrate and polyacrylonitrile staple fibers as raw materials through processes of liquid phase chelation, gelation, calcination, etc. The prepared high-entropy perovskite $Ba_x(FeCoNiZrY)_{0.2}O_{3-\delta}$ electrocatalytic material can release more electrochemical active sites due to its special nanostructure, thus showing better electrocatalytic activity. Meanwhile, by adjusting the stoichiometric ratio of A/B-site metals, the electronic structure change of five metals in a catalytic center and the change of an oxygen vacancy content are realized, and the purpose of adjusting and optimizing the nitrogen reduction performance is achieved, so that the (Continued)

electrocatalytic material has excellent electrocatalytic conversion of nitrogen gas into ammonia gas.

8 Claims, 6 Drawing Sheets

(52) U.S. Cl.
CPC ...... *C01P 2002/34* (2013.01); *C01P 2002/50* (2013.01); *C01P 2002/72* (2013.01); *C01P 2002/77* (2013.01); *C01P 2004/03* (2013.01); *C01P 2006/40* (2013.01)

(56) References Cited

OTHER PUBLICATIONS

Naohiro Shimoda et al. "Ammonia synthesis over yttrium-doped barium zirconate and cerate-based perovskite-type oxide supported ruthenium catalysts" International journal of hydrogen energy, Dec. 14, 2017, vol. 50, Issue 42. p. 29757-29755.

* cited by examiner

ABO₃ TYPE HIGH-ENTROPY PEROVSKITE $Ba_x(FeCoNiZrY)_{0.2}O_{3-delta}$ ELECTROCATALYTIC MATERIAL AND PREPARATION METHOD THEREOF

TECHNICAL FIELD

The present disclosure belongs to the technical field of electrocatalytic materials, and in particular relates to an ABO₃ type high-entropy perovskite $Ba_x(FeCoNiZrY)_{0.2}O_{3-\delta}$ electrocatalytic material and a preparation method thereof.

BACKGROUND

Ammonia is an important chemical that has a wide range of applications in the fields of industry, agriculture and energy. The current industrial-grade ammonia synthesis method is mainly the Haber-Bosch method, which needs to be carried out under harsh conditions (300-500° C., 150-200 atm). The annual energy consumption for ammonia preparation accounts for about 1% of the total global energy consumption. Furthermore, a large amount of greenhouse gases will be generated during a preparation process of the ammonia.

In recent years, using nitrogen gas as a nitrogen source and water as a proton source to prepare ammonia gas by means of an electrocatalysis at normal temperature and normal pressure has gradually become the focus of researchers. This type of green synthesis method has the advantages that the sources of raw materials are wide, production facilities are not subject to geographical restrictions, carbon-based by-products are not produced, and the like. At present, nitrogen reduction catalysts that have been widely reported mainly include metals, metal oxides, metal/carbon composite materials, and so on. However, due to the super stability of nitrogen-nitrogen triple bonds, it is necessary to overcome a higher energy barrier to destroy the nitrogen-nitrogen triple bonds; and furthermore, the reduction potential of a nitrogen reduction reaction is similar to that of a hydrogen evolution reaction, resulting in competition between the two reactions. This is the reason why the efficiency of ammonia synthesis with the nitrogen reduction catalysts is low at present.

Therefore, design and development with abundant active sites and improved nitrogen adsorption are the prerequisite and key to improve the efficiency of electrocatalytic nitrogen reduction for ammonia synthesis.

SUMMARY

In order to solve the above problems, the present disclosure designs and synthesizes a kind of ABO₃ type high-entropy perovskite $Ba_x(FeCoNiZrY)_{0.2}O_{3-\delta}$ electrocatalytic material by means of an improved liquid phase method and a high-temperature calcination method. Compared with a bulk material prepared by the traditional high temperature and high pressure method, the high-entropy perovskite $Ba_x(FeCoNiZrY)_{0.2}O_{3-\delta}$ electrocatalytic material prepared by utilizing the improved liquid phase method-high temperature calcination method in the present disclosure can not only expose more active sites, but also has the advantages of being simple in preparation process, low in energy consumption, high in uniformity, etc, and is expected to be an ideal high-performance electrocatalytic material for reduction of nitrogen gas.

The ABO₃ type high-entropy perovskite material has gradually attracted extensive attention due to its low price, adjustable composition, environmental friendliness, special electronic structure, and the like. In particular, a B-site metal catalytic center of the high-entropy perovskite material is rich in variety and high in structural tolerance. The oxygen defect content of the high-entropy perovskite material can be controlled by adjusting the stoichiometric ratio of A/B-site elements, so that the best cost performance ratio of the catalyst is achieved.

It is the first object of the present disclosure to provide an electrocatalyst for ammonia synthesis, and the electrocatalyst is an ABO₃ type high-entropy perovskite $Ba_x(FeCoNiZrY)_{0.2}O_{3-\delta}$ electrocatalytic material, where A-site metal of the ABO₃ type is Ba, B-site metals include the metals Fe, Co, Ni, Zr and Y, x is 0.9 and 1, and 0<δ<3.

In an implementation of the present disclosure, the atomic ratio of the metals is: Ba:Fe:Co:Ni:Zr:Y=1:0.2:0.2:0.2:0.2:0.2, or Ba:Fe:Co:Ni:Zr:Y=0.9:0.2:0.2:0.2:0.2:0.2.

It is the second object of the present disclosure to provide a method for preparing the electrocatalyst for ammonia synthesis, and the method includes the following steps:

(1) dissolving polyacrylonitrile powder in N, N-dimethylformamide to obtain a polyacrylonitrile solution, and then carrying out electrospinning; pre-oxidizing a membrane obtained by electrospinning at high temperature, then breaking the pre-oxidized membrane and dispersing the pre-oxidized membrane in water to form a pre-oxidized polyacrylonitrile staple fiber dispersion;

(2) dissolving barium salt, ferric salt, cobalt salt, nickel salt, zirconium salt and yttrium salt in water to form an aqueous solution; after that, adding a certain amount of ethylene glycol and citric acid to chelate the metal salts so as to form a clear solution, adjusting the pH to 7-9 with ammonia water, heating and concentrating to form gel and then adding the pre-oxidized polyacrylonitrile staple fiber dispersion obtained in step (1), continuing to concentrate to form gel, and then removing the solvent at high temperature to prepare precursor powder; and (3) calcining the precursor powder obtained in step (2) to obtain the ABO₃ type high-entropy perovskite $Ba_x(FeCoNiZrY)_{0.2}O_{3-\delta}$ electrocatalytic material.

In one implementation of the present disclosure, the weight-average molecular weight of polyacrylonitrile in step (1) is 150,000.

In one implementation of the present disclosure, the concentration of the polyacrylonitrile solution in step (1) is 0.08-0.12 g/mL, preferably 0.1 g/mL.

In one implementation of the present disclosure, the condition of electrospinning in step (1) is 15-20 kV, preferably 17 kV, the distance between a receiver and a needle is 13 cm, and the injection speed is 0.1 mm/min.

In one implementation of the present disclosure, in step (1), the pre-oxidation temperature is 150-200° C., and the pre-oxidation time is 2-5 h. Preferably, the pre-oxidation temperature is 200° C., and the pre-oxidation time is 2 h.

In one implementation of the present disclosure, in step (1), mechanical crushing is used to break the pre-oxidized membrane; and the parameters of the mechanical crushing are: 10000-15000 rpm, and the time is 0.25-1 h. Preferably, the parameters of the mechanical crushing are: 13000 rpm, and the time is 0.5 h.

In one implementation of the present disclosure, in step (2), the cobalt salt includes: $Co(NO_3)_2 \cdot 6H_2O$, the nickel salt includes: $Ni(NO_3)_2 \cdot 6H_2O$, the barium salt includes: $Ba(NO_3)_2$, the ferric salt includes: $Fe(NO_3)_3 \cdot 9H_2O$, the zirconium salt comprises: $Zr(NO_3)_4 \cdot 5H_2O$, and the yttrium salt comprises: $Y(NO_3)_3 \cdot 6H_2O$.

In one implementation of the present disclosure, when x=0.9, the mass concentration of the barium salt in the aqueous solution of step (2) is 4.0-5.0 mg/mL (excluding 5.0 mg/mL), and when x=1, the mass concentration of the barium salt in the aqueous solution of step (2) is 5.0-5.5 mg/mL.

In one implementation of the present disclosure, the mass concentration of the cobalt salt in the aqueous solution of step (2) is 1.0-1.5 mg/mL.

In one implementation of the present disclosure, the mass concentration of the ferric salt in the aqueous solution of step (2) is 1.5-2.0 mg/mL.

In one implementation of the present disclosure, the mass concentration of the nickel salt in the aqueous solution of step (2) is 1.0-1.5 mg/mL.

In one implementation of the present disclosure, the mass concentration of the zirconium salt in the aqueous solution of step (2) is 1.5-2.0 mg/mL.

In one implementation of the present disclosure, the mass concentration of the yttrium salt in the aqueous solution of step (2) is 1.5-2.0 mg/mL.

In one implementation of the present disclosure, the concentration of the citric acid in the aqueous solution of step (2) is 10.0-15.0 mg/mL, and the concentration of the ethylene glycol is 5.0-10.0 mg/mL.

In one implementation of the present disclosure, the mass concentration of the pre-oxidized polyacrylonitrile staple fiber dispersion in step (2) is 3.0-5.0 mg/mL, preferably 4.5 mg/L, and the added amount is 5.0-10.0 mL.

In one implementation of the present disclosure, in step (2), the concentration temperature is 60-100° C., and the concentration time is 10-24 h. Preferably, the concentration temperature is 80° C.; and the concentration time is 24 h.

In one implementation of the present disclosure, in step (2), the high temperature for solvent removal is 150-200° C., and the time for solvent removal is 5-10 h. Preferably, the temperature is 200° C., and the time is 5 h.

In one implementation of the present disclosure, in step (3), the calcination temperature is 800-1200° C., and the calcination time is 5-10 h. Preferably, the calcination temperature is 1000° C., and the calcination time is 5 h.

In one implementation of the present disclosure, in step (2), the barium salt is $Ba(NO_3)_2$, when x=0.9, the amount thereof is 470.4 mg, and when x=1.0, the amount thereof is 522.7 mg; the cobalt salt is $Co(NO_3)_2 \cdot 6H_2O$, and the amount thereof is 116.4 mg; the nickel salt is $Ni(NO_3)_2 \cdot 6H_2O$, and the amount thereof is 116.3 mg; the ferric salt is $Fe(NO_3)_3 \cdot 9H_2O$, and the amount thereof is 161.6 mg; the zirconium salt is $Zr(NO_3)_4 \cdot 5H_2O$, and the amount thereof is 171.7 mg; the yttrium salt is $Y(NO_3)_3 \cdot 6H_2O$, and the amount thereof is 153.2 mg; when x=0.9, the amount of the citric acid is 1095.2 mg, and the amount of the ethylene glycol is 707.6 mg; when x=1, the amount of the citric acid is 1152.8 mg, and the amount of the ethylene glycol is 744.8 mg; the amount of water: 100 mL; and the mass concentration of the pre-oxidized polyacrylonitrile dispersion is 4.5 mg/L, and the amount thereof is 5 mL.

It is the third object of the present disclosure to provide a method for preparing ammonia gas, and the method employs the above-mentioned catalyst or the catalyst prepared by the above-mentioned method as an electrocatalyst.

It is the fourth object of the present disclosure to apply the electrocatalyst for ammonia synthesis to the field of ammonia gas preparation.

Compared with the prior art, the present disclosure has the significant advantages that:

(1) the present disclosure designs and synthesizes such $ABO_3$ type high-entropy perovskite $Ba_x(FeCoNiZrY)_{0.2}O_{3-\delta}$ electrocatalytic material by means of the improved liquid phase method and the high-temperature calcination method;

(2) by adjusting the stoichiometric ratio of A/B-site metals, the electronic structure change of five metals in a catalytic center and the change of an oxygen vacancy content are realized, and the purpose of adjusting and optimizing the nitrogen reduction performance is achieved, so that the electrocatalytic material has excellent electrocatalytic conversion of nitrogen gas into ammonia gas; and (3) the material is simple in preparation process and good in repeated test, thus having the potential value of practical application.

DETAILED DESCRIPTION

The present disclosure will be further described below in conjunction with specific examples. It should be understood that these examples are only used to illustrate the present disclosure and not to limit the scope of the present disclosure. In addition, it should be understood that after reading the contents taught in the present disclosure, those skilled in the art can make various changes or modifications to the present disclosure, and these equivalent forms also fall within the scope defined by the appended Claims of the present application.

Example 1

1 g of polyacrylonitrile powder was dissolved in 10 mL of N, N-dimethylformamide for carrying out electrospinning under a voltage of 17 kV. The obtained membrane was pre-oxidized for 2 h at 200° C. Finally, the pre-oxidized membrane was broken for 0.5 h at 13000 rpm and then disposed in water to form a dispersion, and the concentration of the dispersion was 4.5 mg/mL.

470.4 mg of $Ba(NO_3)_2$, 116.4 mg of $Co(NO_3)_2 \cdot 6H_2O$, 116.3 mg of $Ni(NO_3)_2 \cdot 6H_2O$, 161.6 mg of $Fe(NO_3)_3 \cdot 9H_2O$, 171.7 mg of $Zr(NO_3)_4 \cdot 5H_2O$ and 153.2 mg of $Y(NO_3)_3 \cdot 6H_2O$ were dissolved in 100 mL of deionized water while stirring so as to obtain a clear and transparent solution. Subsequently, 1095.2 mg of citric acid and 707.6 mg of ethylene glycol were added, and the pH was adjusted to 9 with ammonia water. The above solution was concentrated into gel at 80° C. and then added with the pre-oxidized polyacrylonitrile dispersion with a mass concentration of 4.5 mg/L in an amount of 5 mL. After mixing, the solution was continued to be concentrated to form a uniformly dispersed gel-like precursor. The precursor was heated to 200° C. and dried for 5 h to obtain solid powder. Finally, the solid powder was calcined at 1000° C. for 5 h to obtain $ABO_3$ type high-entropy perovskite $Ba_{0.9}(FeCoNiZrY)_{0.2}O_{3-\delta}$.

The relevant process parameters in an electrochemical test method were as follows: ink was formed by uniformly mixing 6 mg of $Ba_x(FeCoNiZrY)_{0.2}O_{3-\delta}$ and an ethanol (1940 µL) solution of Nafion (5 wt %, 60 µL). 1×1 cm² carbon paper was coated with 40 µL of the above ink and dried to prepare an electrode slice.

According to experimental testing, $Ba_{0.9}(FeCoNiZrY)_{0.2}O_{3-\delta}$ has nitrogen electric reduction performance. Within a certain overpotential range, the highest ammonia gas production and the highest Faraday efficiency are 24.37 µg h$^{-1}$ mg$^{-1}_{cat}$ and 11.70%.

1 g of polyacrylonitrile powder was dissolved in 10 mL of N, N-dimethylformamide for carrying out electrospinning under a voltage of 17 kV. The obtained membrane was pre-oxidized for 2 h at 200° C. Finally, the pre-oxidized membrane was broken for 0.5 h at 13000 rpm and then disposed in water to form a dispersion, and the concentration of the dispersion was 4.5 mg/mL.

522.7 mg of $Ba(NO_3)_2$, 116.4 mg of $Co(NO_3)_2 \cdot 6H_2O$, 116.3 mg of $Ni(NO_3)_2 \cdot 6H_2O$, 161.6 mg of $Fe(NO_3)_3 \cdot 9H_2O$, 171.7 mg of $Zr(NO_3)_4 \cdot 5H_2O$ and 153.2 mg of $Y(NO_3)_3 \cdot 6H_2O$ were dissolved in 100 mL of deionized water while stirring so as to obtain a clear and transparent solution. Subsequently, 1152.8 mg of citric acid and 744.8 mg of ethylene glycol were added, and the pH was adjusted to 9 with ammonia water. The above solution was concentrated into gel at 80° C. and then added with the pre-oxidized polyacrylonitrile dispersion with a mass concentration of 4.5 mg/L in an amount of 5 mL. After mixing, the solution was continued to be concentrated to form a uniformly dispersed gel-like precursor. The precursor was heated to 200° C. and dried for 5 h to obtain solid powder. Finally, the solid powder was calcined at 1000° C. for 5 h to obtain $ABO_3$ type high-entropy perovskite $Ba(FeCoNiZrY)_{0.2}O_{3-\delta}$.

According to the experimental testing described in Example 1, $Ba(FeCoNiZrY)_{0.2}O_{3-\delta}$ has nitrogen electric reduction performance. Within a certain overpotential range, the highest ammonia gas production and the highest Faraday efficiency are 16.11 µg h$^{-1}$ mg$^{-1}_{cat}$ and 6.01%.

Figure 1:
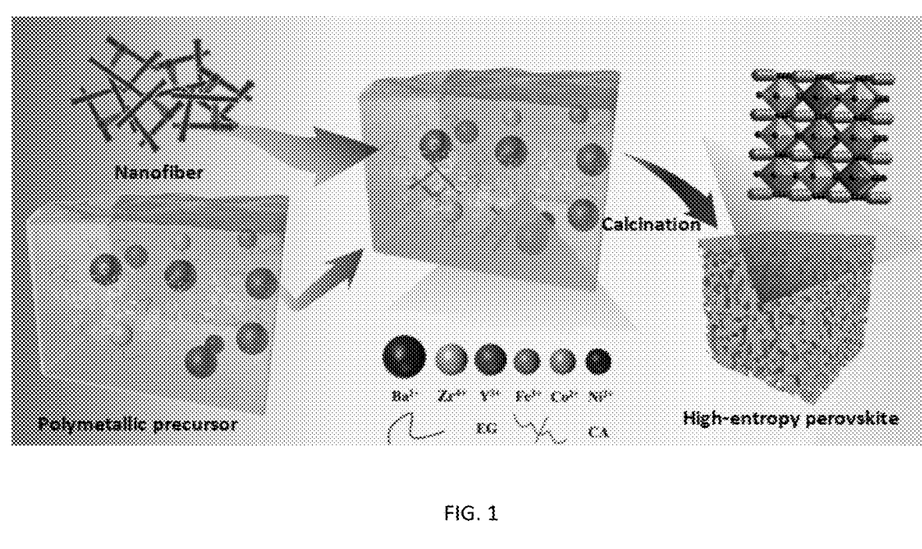
FIG. 1 is a schematic diagram of an $ABO_3$ type high-entropy perovskite $Ba_x(FeCoNiZrY)_{0.2}O_{3-\delta}$ electrocatalytic material and a preparation method thereof according to the present disclosure.

FIG. 1 is a schematic diagram of a preparation process of $ABO_3$ type high-entropy perovskite $Ba(FeCoNiZrY)_{0.2}O_{3-\delta}$.

Figure 2A:
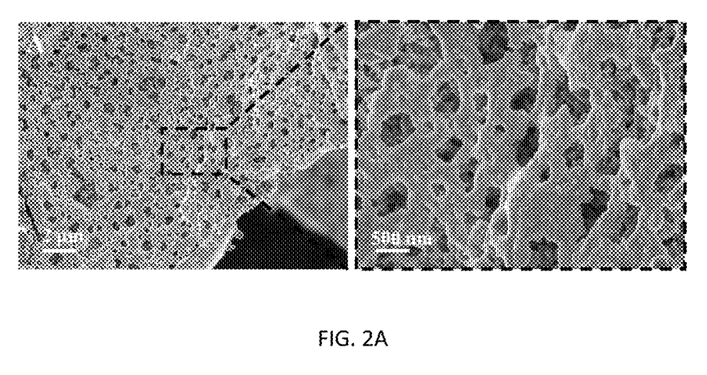
FIG. 2A is a scanning electron microscope (SEM) photograph of an $ABO_3$ type high-entropy perovskite $Ba_x(FeCoNiZrY)_{0.2}O_{3-\delta}$ electrocatalytic material (x=0.9) prepared according to Example 1 of the present disclosure.
Figure 2B:
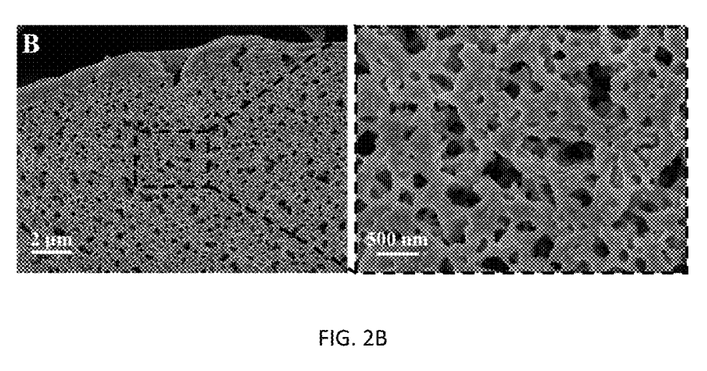
FIG. 2B is a scanning electron microscope (SEM) photograph of the $ABO_3$ type high-entropy perovskite $Ba_x(FeCoNiZrY)_{0.2}O_{3-\delta}$ electrocatalytic material (x=1) prepared according to Example 2 of the present disclosure.

SEM, XRD, EDX, ICP, XPS, and electrochemical workstations were used to characterize the morphology features, electronic structure, and performance as a nitrogen gas reduction electrocatalyst of the $ABO_3$ type high-entropy perovskite $Ba(FeCoNiZrY)_{0.2}O_{3-\delta}$ electrocatalytic material obtained according to the present disclosure. The determination results were as follows:

(1) The SEM test results show (see FIG. 2) that the high-entropy perovskite $Ba_x(FeCoNiZrY)_{0.2}O_{3-\delta}$ has a lava-like morphology, and the pore size is about 300 nm.

Figure 3:
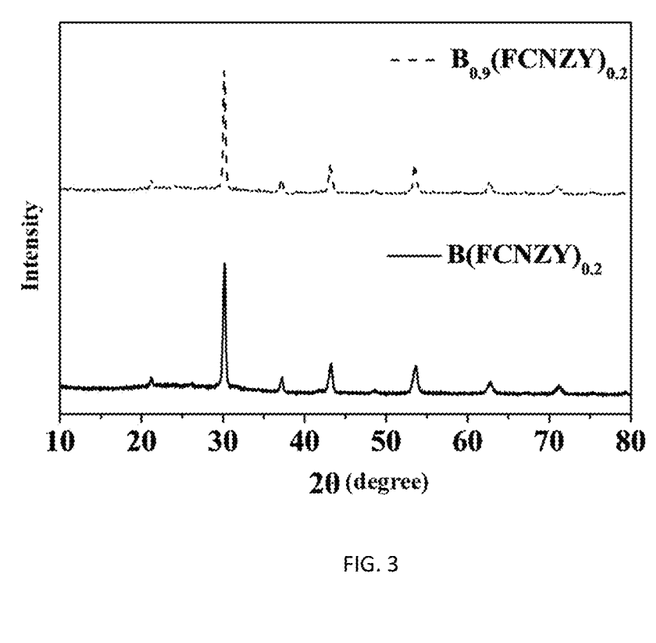
FIG. 3 is an X-ray diffractometer (XRD) spectrogram of the $ABO_3$ type high-entropy perovskite $Ba_x(FeCoNiZrY)_{0.2}O_{3-\delta}$ electrocatalytic material prepared according to Examples 1 and 2 of the present disclosure.

(2) XRD test results show again (see FIG. 3) that the crystal structure of the high-entropy perovskite $Ba_x(FeCoNiZrY)_{0.2}O_{3-\delta}$ is a cubic phase structure, which conforms to the general structure of perovskite materials.

Figure 4A:
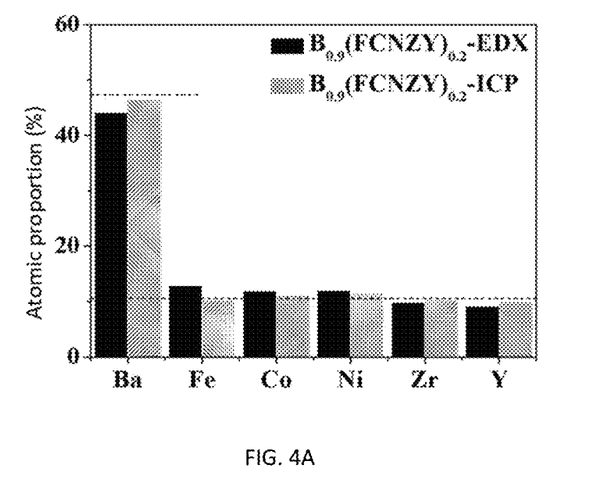
FIG. 4A shows the energy dispersive X-ray analysis (EDX) and inductively coupled plasma spectroscopy test (ICP) results of the $ABO_3$ type high-entropy perovskite $Ba_x(FeCoNiZrY)_{0.2}O_{3-\delta}$ electrocatalytic material (x=0.9) prepared according to Example 1 of the present disclosure.
Figure 4B:
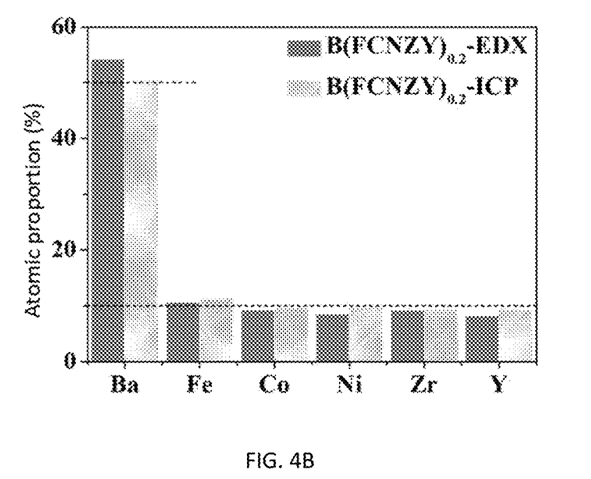
FIG. 4B shows the energy dispersive X-ray analysis (EDX) and inductively coupled plasma spectroscopy test (ICP) results of the $ABO_3$ type high-entropy perovskite $Ba_x(FeCoNiZrY)_{0.2}O_{3-\delta}$ electrocatalytic material (x=1) prepared according to Example 2 of the present disclosure.

(3) EDX analysis and ICP analysis show (see FIG. 4) that the Ba, Fe, Co, Ni, Zr, Y and O elements on the surface of the high-entropy perovskite $Ba_x(FeCoNiZrY)_{0.2}O_{3-\delta}$ material are uniformly distributed, and the ratio of the surface metals conforms to a feed ratio. It further illustrates the successful synthesis of high-entropy perovskite.

Figure 5:
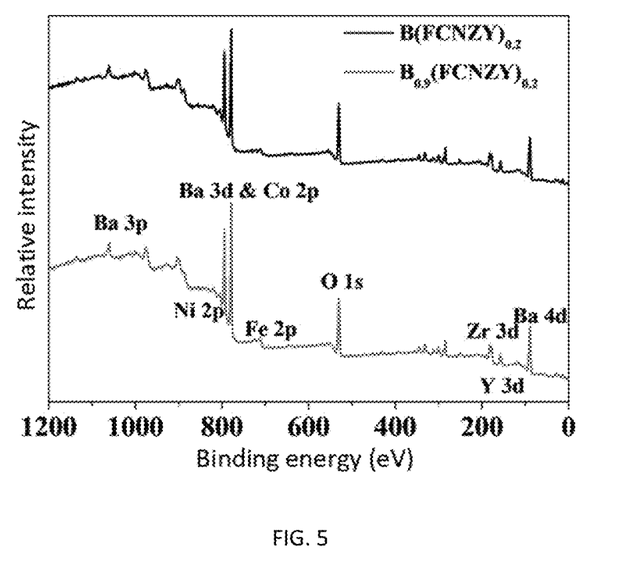
FIG. 5 is an X-ray photoelectron spectroscopy (XPS) curve of the $ABO_3$ type high-entropy perovskite $Ba_x(FeCoNiZrY)_{0.2}O_{3-\delta}$ electrocatalytic material prepared according to Examples 1 and 2 of the present disclosure.

(4) XPS test results further prove that the surface of the high-entropy perovskite $Ba_x(FeCoNiZrY)_{0.2}O_{3-\delta}$ material has Ba, Fe, Co, Ni, Zr, Y and O elements, as shown in FIG. 5.

Figure 6:
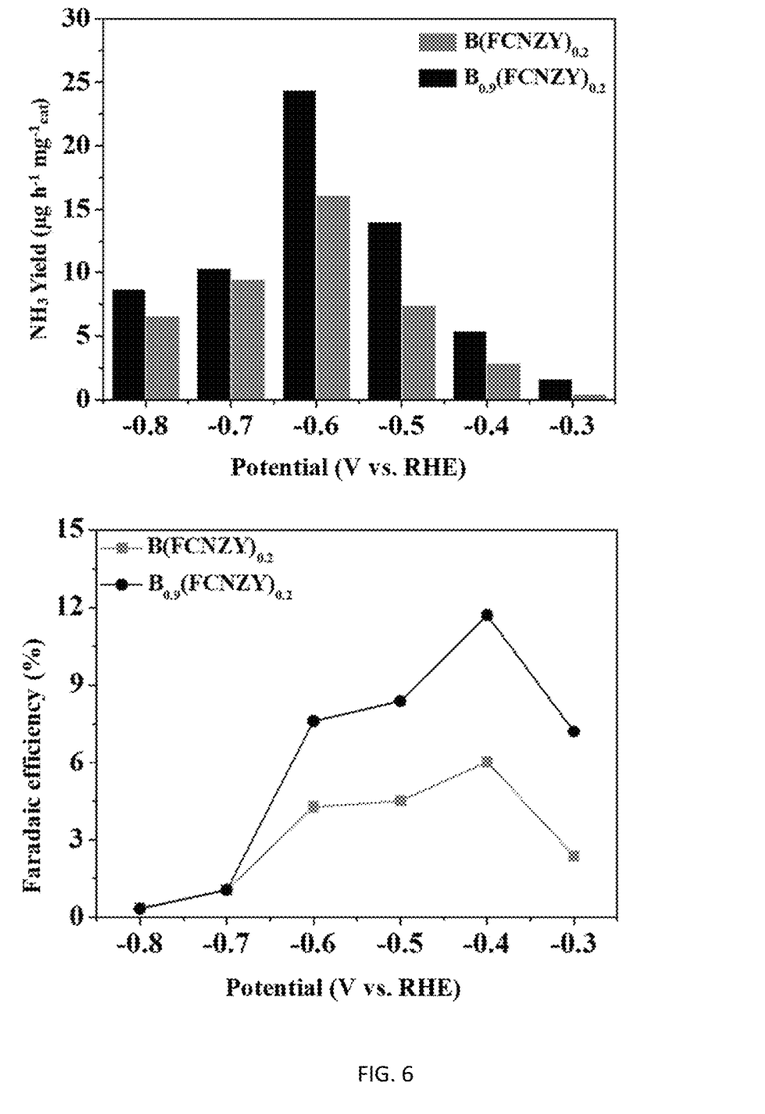
FIG. 6 is a performance diagram of the electrocatalytic reduction of nitrogen gas to ammonia gas of the $ABO_3$ type high-entropy perovskite $Ba_x(FeCoNiZrY)_{0.2}O_{3-\delta}$ electrocatalytic material prepared according to Examples 1 and 2 of the present disclosure.

(5) The electrochemical test results show that the prepared $ABO_3$ type high-entropy perovskite $Ba_x(FeCoNiZrY)_{0.2}O_{3-\delta}$ materials all have excellent nitrogen reduction performance. When x=0.9, the $Ba_x(FeCoNiZrY)_{0.2}O_{3-\delta}$ has the highest ammonia gas production and the highest Faraday efficiency, which are 24.37 µg·h$^{-1}$·mg$^{-1}_{cat}$ and 11.70%, respectively, as shown in FIG. 6.

Example 3

1.2 g of polyacrylonitrile powder was dissolved in 10 mL of N, N-dimethylformamide for carrying out electrospinning under a voltage of 17 kV. The obtained membrane was pre-oxidized for 5 h at 150° C. Finally, the pre-oxidized membrane was broken for 0.5 h at 13000 rpm and then disposed in water to form a dispersion, and the concentration of the dispersion was 4.5 mg/mL.

522.7 mg of $Ba(NO_3)_2$, 116.4 mg of $Co(NO_3)_2 \cdot 6H_2O$, 116.3 mg of $Ni(NO_3)_2 \cdot 6H_2O$, 161.6 mg of $Fe(NO_3)_3 \cdot 9H_2O$, 171.7 mg of $Zr(NO_3)_4 \cdot 5H_2O$ and 153.2 mg of $Y(NO_3)_3 \cdot 6H_2O$ were dissolved in 100 mL of deionized water while stirring so as to obtain a clear and transparent solution. Subsequently, 1152.8 mg of citric acid and 744.8 mg of ethylene glycol were added, and the pH was adjusted to 9 with ammonia water. The above solution was concentrated into gel at 80° C. and then added with the pre-oxidized polyacrylonitrile dispersion with a mass concentration of 4.5 mg/L in an amount of 5 mL. After mixing, the solution was continued to be concentrated to form a uniformly dispersed gel-like precursor. The precursor was heated to 150° C. and dried for 10 h to obtain solid powder. Finally, the solid powder was calcined at 850° C. for 5 h to obtain $ABO_3$ type high-entropy perovskite $Ba(FeCoNiZrY)_{0.2}O_{3-\delta}$.

The morphology of the prepared $Ba(FeCoNiZrY)_{0.2}O_{3-\delta}$ is similar to that of Example 2, and the electrocatalytic performance thereof is similar to that of Example 2.

Example 4

1 g of polyacrylonitrile powder was dissolved in 10 mL of N, N-dimethylformamide for carrying out electrospinning under a voltage of 17 kV. The obtained membrane was pre-oxidized for 2 h at 200° C. Finally, the pre-oxidized membrane was broken for 0.5 h at 13000 rpm and then disposed in water to form a dispersion, and the concentration of the dispersion was 4.5 mg/mL.

470.4 mg of $Ba(NO_3)_2$, 116.4 mg of $Co(NO_3)_2 \cdot 6H_2O$, 116.3 mg of $Ni(NO_3)_2 \cdot 6H_2O$, 161.6 mg of $Fe(NO_3)_3 \cdot 9H_2O$, 171.7 mg of $Zr(NO_3)_4 \cdot 5H_2O$ and 153.2 mg of $Y(NO_3)_3 \cdot 6H_2O$ were dissolved in 100 mL of deionized water while stirring so as to obtain a clear and transparent solution. Subsequently, 1152.8 mg of citric acid and 744.8 mg of ethylene glycol were added, and the pH was adjusted to 9 with ammonia water. The above solution was concentrated into gel at 80° C. and then added with the pre-oxidized polyacrylonitrile dispersion with a mass concentration of 4.5 mg/L in an amount of 10 mL. After mixing, the solution was continued to be concentrated to form a uniformly dispersed gel-like precursor. The precursor was heated to 200° C. and dried for 5 h to obtain solid powder. Finally, the solid powder was calcined at 1100° C. for 5 h to obtain $ABO_3$ type high-entropy perovskite $Ba_{0.9}(FeCoNiZrY)_{0.2}O_{3-\delta}$.

The morphology of the prepared $Ba_{0.9}(FeCoNiZrY)_{0.2}O_{3-\delta}$ is similar to that of Example 1, and the electrocatalytic performance thereof is similar to that of Example 1.

Comparative Example 1

When the concentration of the polyacrylonitrile in step 1 was further increased, or the calcination temperature in step 2 was lower than 800° C., the high-entropy perovskite phase will be impure.

Comparative Example 2

When there was no step (1), the remaining operating parameters were the same as in those in Example 1 (the pre-oxidized polyacrylonitrile staple fiber dispersion was not needed in step (2)), and the prepared $Ba_x(FeCoNiZrY)_{0.2}O_{3-\delta}$ electrocatalytic material did not have the morphological structure as shown in FIG. 2, and was very poor in electrocatalytic performance.

Although the present disclosure has been disclosed as above with exemplary examples, it is not intended to limit the present disclosure. Anyone who is familiar with this technology can make various changes and modifications without departing from the spirit and scope of the present disclosure. Therefore, the protection scope of the present disclosure shall prevail as defined in the claims.

What is claimed is:

1. An electrocatalyst for ammonia synthesis, wherein the electrocatalyst is an $ABO_3$ type high-entropy perovskite $Ba_x(FeCoNiZrY)_{0.2}O_{3-\delta}$ electrocatalytic material, wherein A-site metal of the $ABO_3$ type is Ba, B-site metals comprise the metals Fe, Co, Ni, Zr and Y, x is 0.9 or 1, and $0<\delta<3$.

2. The electrocatalyst for ammonia synthesis according to claim 1, wherein the atomic ratio of the metals is as follows: Ba:Fe:Co:Ni:Zr:Y=1:0.2:0.2:0.2:0.2:0.2, or Ba:Fe:Co:Ni:Zr:Y=0.9:0.2:0.2:0.2:0.2:0.2.

3. A method for preparing the electrocatalyst for ammonia synthesis according to claim 1, wherein the method comprises the following steps:
    (1) dissolving polyacrylonitrile powder in N, N-dimethylformamide to obtain a polyacrylonitrile solution, and then carrying out electrospinning; pre-oxidizing a membrane obtained by electrospinning at a predetermined temperature, then breaking the pre-oxidized membrane and dispersing the pre-oxidized membrane in water to form a pre-oxidized polyacrylonitrile staple fiber dispersion;
    (2) dissolving barium salt, ferric salt, cobalt salt, nickel salt, zirconium salt and yttrium salt in water to form an aqueous solution; after that, adding a certain amount of ethylene glycol and citric acid to chelate the metal salts so as to form a clear solution, adjusting the pH to 7-9 with ammonia water, heating and concentrating to form gel and then adding the pre-oxidized polyacrylonitrile staple fiber dispersion obtained in step (1), continuing to concentrate to form gel, and then removing a solvent at a predetermined temperature to prepare a precursor powder; and
    (3) calcining the precursor powder obtained in step (2) to obtain the $ABO_3$ type high-entropy perovskite $Ba_x(FeCoNiZrY)_{0.2}O_{3-\delta}$ electrocatalytic material.

4. The method according to claim 3, wherein in step (1), the concentration of the polyacrylonitrile solution is 0.08-0.12 g/mL, and a condition of electrospinning is 15-20 kV.

5. The method according to claim 3, wherein in step (1), a pre-oxidation temperature is 150-200° C., and pre-oxidation time is 2-5 hours.

6. The method according to claim 3, wherein in step (2), the cobalt salt comprises: $Co(NO_3)_2 \cdot 6H_2O$, with a concentration of 1.0-1.5 mg/mL; the nickel salt comprises: $Ni(NO_3)_2 \cdot 6H_2O$, with a concentration of 1.0-1.5 mg/mL; the ferric salt comprises: $Fe(NO_3)_3 \cdot 9H_2O$, with a concentration of 1.5-2.0 mg/mL; the zirconium salt comprises: $Zr(NO_3)_4 \cdot 5H_2O$, with a concentration of 1.5-2.0 mg/mL; the yttrium salt comprises: $Y(NO_3)_3 \cdot 6H_2O$, with a concentration of 1.5-2.0 mg/mL; and the barium salt comprises: $Ba(NO_3)_2$, when x=0.9, the concentration of the barium salt is 4.0-5.0 mg/mL (excluding 5.0 mg/mL), and when x=1, the concentration of the barium salt is 5.0-5.5 mg/mL.

7. The method according to claim 3, wherein the concentration of the citric acid in the aqueous solution of step (2) is 10.0-15.0 mg/mL, and the concentration of the ethylene glycol is 5.0-10.0 mg/mL.

8. The method according to claim 3, wherein in step (3), a calcination temperature is 800-1200° C., and calcination time is 5-10 hours.

* * * * *